(12) United States Patent
Dubrovin et al.

(10) Patent No.: US 8,850,123 B2
(45) Date of Patent: Sep. 30, 2014

(54) CACHE PREFETCH LEARNING

(75) Inventors: Leonid Dubrovin, Karney Shomron (IL); Alexander Rabinovitch, Kfar Yona (IL); Dmitry Podvalny, Petah Tikva (IL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 418 days.

(21) Appl. No.: 12/907,204

(22) Filed: Oct. 19, 2010

(65) Prior Publication Data

US 2012/0096227 A1    Apr. 19, 2012

(51) Int. Cl.
*G06F 12/00* (2006.01)
*G06F 12/08* (2006.01)

(52) U.S. Cl.
CPC .... *G06F 12/0862* (2013.01); *G06F 2212/6024* (2013.01)
USPC ............. 711/137; 711/204; 710/14; 710/15

(58) Field of Classification Search
USPC ............................. 711/137, 204; 710/14, 15
See application file for complete search history.

(56) References Cited

U.S. PATENT DOCUMENTS

| | | | |
|---|---|---|---|
| 6,401,193 B1 * | 6/2002 | Afsar et al. ................ | 712/207 |
| 7,430,650 B1 * | 9/2008 | Ross ........................... | 711/213 |
| 2002/0032841 A1 * | 3/2002 | Yamashiroya .............. | 711/133 |
| 2006/0004966 A1 * | 1/2006 | Maeda et al. .............. | 711/137 |
| 2007/0150660 A1 | 6/2007 | Marathe et al. ............ | 711/137 |
| 2007/0288697 A1 | 12/2007 | Keltcher ..................... | 711/137 |
| 2009/0217004 A1 * | 8/2009 | Van De Waerdt et al. ... | 712/207 |

* cited by examiner

*Primary Examiner* — Kalpit Parikh
(74) *Attorney, Agent, or Firm* — Christopher P. Maiorana, PC

(57) ABSTRACT

An apparatus generally having a processor, a cache and a circuit is disclosed. The processor may be configured to generate (i) a plurality of access addresses and (ii) a plurality of program counter values corresponding to the access addresses. The cache may be configured to present in response to the access addresses (i) a plurality of data words and (ii) a plurality of address information corresponding to the data words. The circuit may be configured to record a plurality of events in a file in response to a plurality of cache misses. A first of the events in the file due to a first of the cache misses generally includes (i) a first of the program counter values, (ii) a first of the address information and (iii) a first time to prefetch a first of the data word from a memory to the cache.

20 Claims, 4 Drawing Sheets

| ENTRY NUMBER | CACHE MISS PC (PCmiss) | ADDRESS INFORMATION | HOLD DURATION | TRIGGER PC (PCtrigger) | COUNT |
|---|---|---|---|---|---|
| 1 | 0x1000_0000 | 0x3000_1234 | 30 | 0x0FFF_FFD0 | 27 |
| 2 | 0x1000_0320 | 0x3000_5555 | 120 | 0x1000_0200 | 356 |
| 3 | 0x1000_0740 | 0x3000_0EB1 | 30 | 0x1000_0710 | 914 |

FIG. 2

CACHE PREFETCH LEARNING

FIELD OF THE INVENTION

The present invention relates to cache circuits generally and, more particularly, to a method and/or apparatus for implementing cache prefetch learning.

BACKGROUND OF THE INVENTION

Caches are used to improve processor core performance in systems where data accessed by the processor core is located in slow or far memory. A usual cache strategy is to fetch a line of data into a cache on any data request from the processor core that causes a cache miss. Fetching cache misses causes a degradation of an application cycle count. The degradation is caused by processor core cycles spent to bring the cache line from the memory to the cache. A standard approach to fix the problem is to include a software prefetch instruction in the code "before" memory access instructions that could cause a cache miss. The software prefetch instruction approach allows the data to be brought to the cache in the background. A disadvantage of the software prefetch instruction approach is that a programmer places the prefetch instructions in possible cache miss locations in the code, causing both an increase in the code size and uncontrolled cache pollution. Another standard approach is to use a hardware prefetch circuit that brings a next line from memory to the cache after any cache access, both hit and miss. The hardware approach is problematic for complex (i.e., nonsequential) patterns of processed data or programs.

SUMMARY OF THE INVENTION

The present invention concerns an apparatus generally having a processor, a cache and a circuit. The processor may be configured to generate (i) a plurality of access addresses and (ii) a plurality of program counter values corresponding to the access addresses. The cache may be configured to present in response to the access addresses (i) a plurality of data words and (ii) a plurality of address information corresponding to the data words. The circuit may be configured to record a plurality of events in a file in response to a plurality of cache misses. A first of the events in the file due to a first of the cache misses generally includes (i) a first of the program counter values, (ii) a first of the address information and (iii) a first time to prefetch a first of the data word from a memory to the cache.

The objects, features and advantages of the present invention include providing a method and/or apparatus for implementing cache prefetch learning that may (i) detect cache misses based on the cache holds, (ii) detect cache misses based on the contents of a fill bus, (iii) detect cache misses based on a miss signal generated by the cache, (iv) generate an event in a file recording a prefetch time and address based on information about the cache miss, (v) identify locations in a program code to insert prefetch instructions, (vi) add one or more instructions in a programing model to store (unload) the file from a learning circuit, (vii) add one or mor instructions to the programming mode to restore (load) the file to the learning circuit, (viii) originate a prefetch based on the information recorded in the file, (ix) request permission from a processor to initiate a prefetch and/or (x) generate information for one or more human users.

BRIEF DESCRIPTION OF THE DRAWINGS

These and other objects, features and advantages of the present invention will be apparent from the following detailed description and the appended claims and drawings in which:

FIG. 2 is a table of example information in a file;

DETAILED DESCRIPTION OF THE PREFERRED EMBODIMENTS

Some embodiments of the present invention may provide a mechanism for learning experienced cache misses on the given software code block, storing the related information and usage of the stored information to generate software and/or hardware cache prefetches. Some embodiments may provide a way to decide what may be the best timing to generate the prefetches to minimize degradations introduced by the cache misses.

Figure 1:
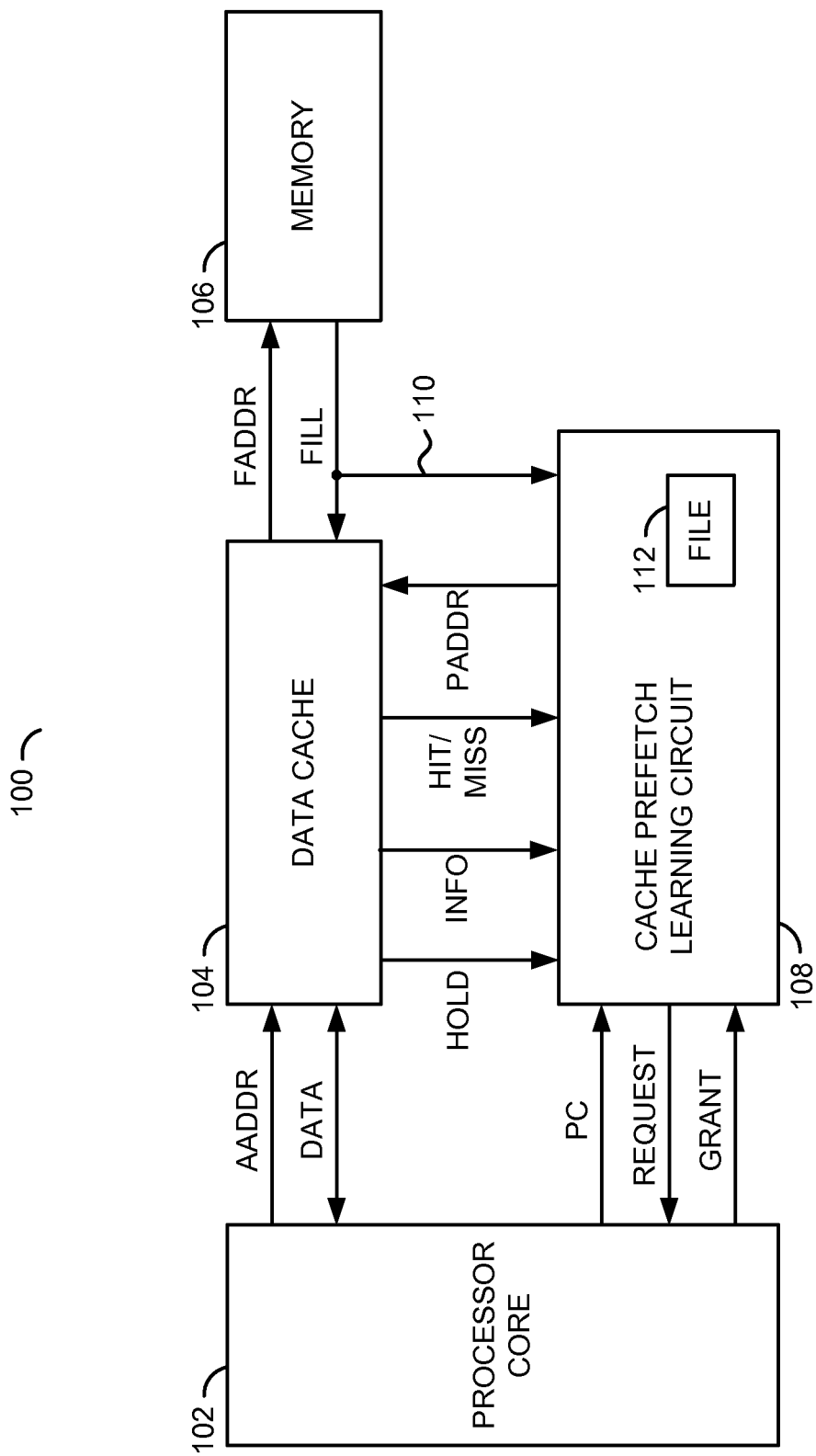
FIG. 1 is a block diagram of an apparatus in accordance with a preferred embodiment of the present invention.

Referring to FIG. 1, a block diagram of an apparatus 100 is shown in accordance with a preferred embodiment of the present invention. The apparatus (device or circuit) 100 generally comprises a circuit (or module) 102, a circuit (or module) 104, a circuit (or module) 106, a circuit (or module) 108 and a bus (or communication link) 110. The circuits 102 to 110 may represent modules and/or blocks that may be implemented as hardware, firmware, software, a combination of hardware, firmware and/or software, or other implementations.

A signal (e.g., AADDR) may be generated by the circuit 102 and transferred to the circuit 104. The circuit 104 may generate a signal (e.g., DATA) received by the circuit 102. A signal (e.g., PC) may also be generated by the circuit 102 and received by the circuit 108. The circuit 108 may generate an optional signal (e.g., REQUEST) received by the circuit 102. An optional signal (e.g., GRANT) may be generated by the circuit 102 and received by the circuit 108. An optional signal (e.g., HOLD) may be generated by the circuit 104 and transferred to the circuit 108. The circuit 104 may also generate a signal (e.g., INFO) received by the circuit 108. An optional signal (e.g., HIT/MISS) may be generated by the circuit 104 and received by the circuit 108. The circuit 108 may generate an optional signal (e.g., PADDR) presented to the circuit 104. A signal (e.g., FADDR) may be presented from the circuit 104 to the circuit 106. The circuit 106 may generate a signal (e.g., FILL) on the fill bus 110. The signal FILL may be received by the circuit 104 and optionally received by the circuit 108.

The circuit 102 may implement a processor circuit. The circuit 102 is generally operational to execute a sequence of software program instructions. Each program instruction may be identified by a program counter. A value of the program counter currently being executed may be presented in the signal PC. One or more data words may be accessed by the program instruction being executed. The one or more data words may be identified by an access address presented in the signal AADDR. In some embodiments, the access addresses may implement virtual addresses. In other embodiments, the access addresses may implement physical addresses. The accessed data words may be received by the circuit 102 in the signal DATA.

The circuit 104 generally implements a data cache circuit. The circuit 104 is generally operational to exchange one or more types of information between the circuit 106 and the circuit 102 via the signal DATA and the signal FILL. In some embodiments, the circuit 104 may be arranged as multiple independent caches. Each cache may be direct mapped, multi-way set associative, multi-way skewed associative and/ or fully associative. In some embodiments, one or more of the caches may implement a level-2 cache that exchanges data words between the circuit 106 and the circuit 102. In other embodiments, one or more of the caches may implement a data cache that exchanges data words between the circuit 106 and the circuit 102. Transfers of data words and the like between the circuits 102, 104 and 106 may be controlled in a normal manner. Cache misses may be handled in a normal fashion. Data written into the circuit 104 by the circuit 102 may be copied back to the circuit 106 in a normal manner.

The circuit 106 generally implements a main memory circuit. The circuit 106 may be operational to store data, program instructions, commands, tasks and other information used by the circuit 102 and optionally other circuitry of the apparatus 100.

The circuit 108 may implement a cache learning circuit. The circuit 108 may be operational in a learning mode (or state) to record cache miss events in a file 112. Each cache miss event generally records the program counter value (e.g., cache miss program counter value) of the software program instruction that causes the cache miss (e.g., a cache miss program instruction), address information (e.g., a physical address) indicating where the missing data word in stored in the circuit 106, a fetch time (e.g., processor clock cycles) that may be consumed bringing the missing data word from the circuit 106 to the circuit 104 and a number of times that the cache miss program instruction causes a cache miss during a normal run of the program code. The circuit 108 may also be operational to identify other program counter values (e.g., trigger program counter values) that were issued at least the fetch times before the cache miss software program instructions. The trigger program counter values may or may not cause cache misses themselves.

Referring to FIG. 2, a table of example information in the file 112 is shown. The table generally includes a cache miss event in each row. The leftmost column may indicate an entry number for each cache miss event (e.g., 1, 2, 3, . . . ). A next column may record the cache miss program counter values (e.g., PCmiss) that cause one or more cache misses. A column may record address information that identifies where in the circuit 106 (e.g., at what address) the missing data word is located. A next column may record a hold duration value. The hold duration value may indicate how much time (e.g., processor clock cycles) is used in transferring the missing data word from the circuit 106 to the circuit 104. Another column may record the trigger program counter values (e.g., PCtrigger) associated with the cache miss program counter values. Each value PCtrigger is positioned in the program count sequence at least the hold duration earlier than the corresponding value PCmiss. In some embodiments, the values PCtrigger are generated just in time by the circuit 108 rather than being recorded in the file 112. In operation, when a value PCtrigger is found in the signal PC, the circuit 104 may take action to prefetch the data word that may soon be accessed when the signal PC reaches the value PCmiss. If the missing data word is prefetched early enough, the normal cache miss may be avoided. The rightmost column may include a count value of the number of cache misses associated with each cache miss event. The count values may be used by the circuit 108 to generate a cost function for fetching the corresponding cache line. In some embodiments, cache miss events with count values below a threshold value may be considered too expensive and ignored.

Returning to FIG. 1, the circuit 108 may be operational in a running mode (or state) to monitor the signal PC for the program counter values that indicate a possible cache miss in the future. When the circuit 108 identifies a program counter value in the signal PC that matches a value PCtrigger in the file 112, the circuit 108 may take action to move the soon-to-be-missing data word into the circuit 104.

In some embodiments, the circuit 108 may generate a request to the circuit 102 via the signal REQUEST to prefetch the soon-to-be-missing data word. If the circuit 102 grants the request in the signal GRANT, the circuit 104 may issue a prefetch request address to the circuit 104 in the signal PADDR. The circuit 104 may subsequently prefetch the data word at the requested address in the circuit 106 via the signal FADDR. If the circuit 102 denies the request, the circuit 108 may ignore the trigger program counter.

In some embodiments, the circuit 108 may not ask for permission to initiate a prefetch. Instead, the circuit 108 may issue a prefetch request address directly to the circuit 104 in the signal FADDR. The circuit 104 then generally obtains the data word at the requested address from the circuit 106.

The circuit 108 may be further operational to operate in both the learning mode and in the running mode concurrently. For example, the file 112 may be loaded into the circuit 108 at the start of execution. The loaded filed 112 may include previous known cache miss events. As the software code is executed, the circuit 108 may continue learning about new cache misses. While learning, the circuit 108 may issue prefetch commands for the known cache miss program instructions recorded in the file 112.

Figure 3:
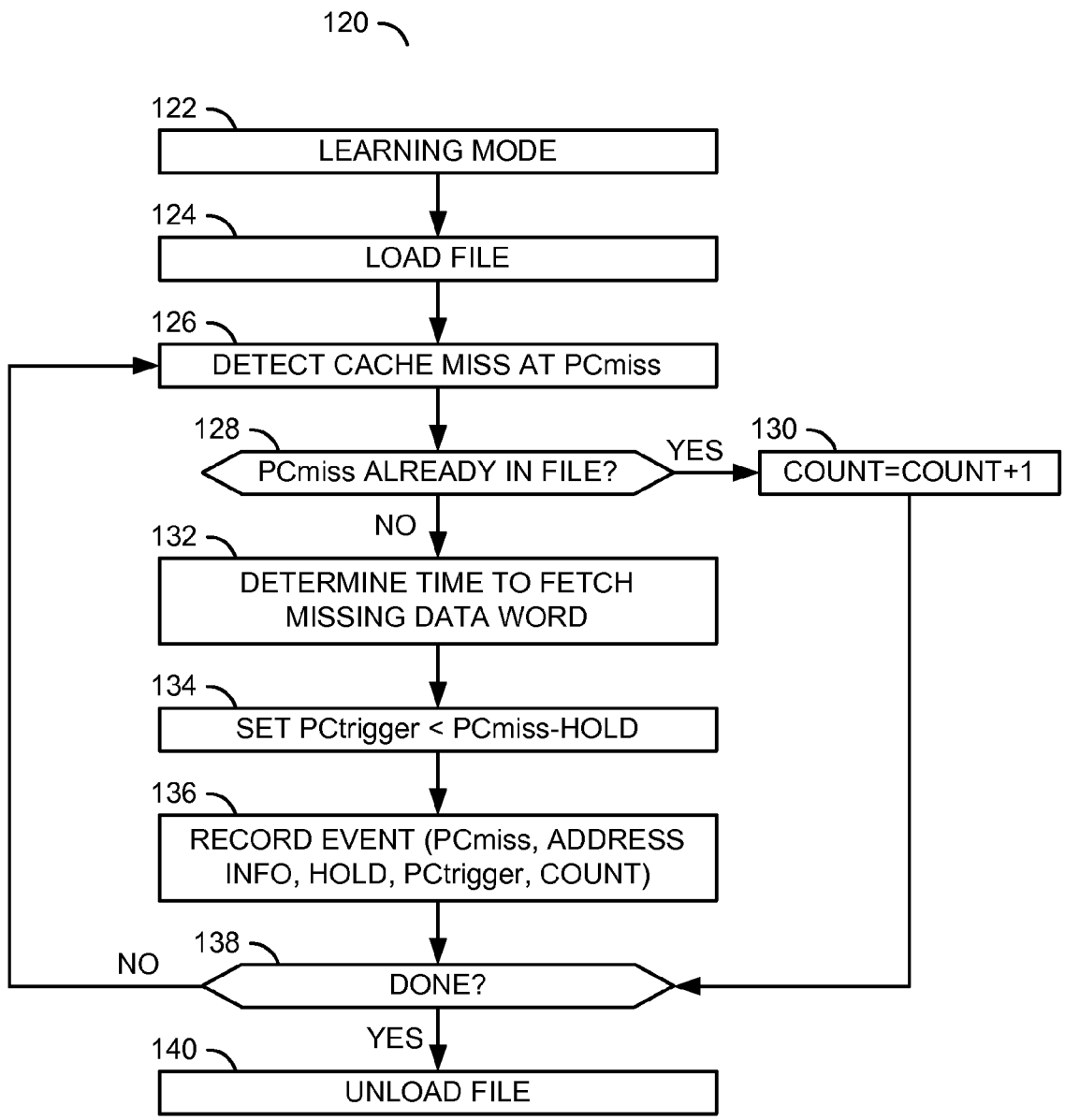
FIG. 3 is a flow diagram of an example implementation of a learning method.

Referring to FIG. 3, a flow diagram of an example implementation of a learning method 120 is shown. The method (or process) 120 may be implemented by the apparatus 100 such that the circuit 108 learns where the cache miss program instructions are located by program counter. The method 120 generally comprises a step (or block) 122, a step (or block) 124, a step (or block) 126, a step (or block) 128, a step (or block) 130, a step (or block) 132, a step (or block) 134, a step (or block) 136, a step (or block) 138 and a step (or block) 140. The steps 122 to 140 may represent modules and/or blocks that may be implemented as hardware, firmware, software, a combination of hardware, firmware and/or software, or other implementations.

In the step 122, the circuit 108 may be placed in the learning mode by the circuit 102 or through a command from an external signal. In some embodiments, a previously started file 112 may be loaded into the circuit 108 in the step 124. The previously started file 112 may include one or more known cache miss events with the corresponding information. In other embodiments, the file 112 may start empty.

In the step 126, the circuit 108 may detect a cache miss corresponding to a program counter value (e.g., PCmiss). Detection may be performed by one or more techniques. In some embodiments, the circuit 104 may assert the signal HIT/MISS in a miss condition (or state) to indicate a cache miss. The circuit 108 may respond to the assertion of the signal HIT/MISS in the miss condition to begin recording a potentially new cache miss event. In some embodiments, the circuit 108 may detect a cache miss by observing a delay by the circuit 104 in providing the accessed data word back to the circuit 102. If the accessed data word is in the cache (e.g., a cache hit), the circuit 104 should present the accessed data word in short order to the circuit 102. If the accessed data word is not in the cache (e.g., a cache miss), a significant delay may follow while the missing data word is fetched from the circuit 106. In other embodiments, the circuit 108 may detect a cache miss by monitoring the transfer of data via the signal FILL on the fill bus 110. If the accessed data word is in the cache (e.g., a cache hit), no fill should occur on the fill bus 110. if the accessed data word is missing from the cache (e.g., a cache miss) the fill bus 110 should become active fetching the missing data word. Other techniques to determine a cache miss may be implemented to meet the criteria of a particular application.

In the step 128, the circuit 108 may compare the newly detected value PCmiss with the existing events in the file 112. If the new value PCmiss matches an existing program counter value previously recorded (e.g., the YES branch of step 128), the circuit 108 may increment the corresponding count value in the step 130 and continue with step 138. If the new value PCmiss is not found in the file 112 (e.g., the NO branch of step 128), the circuit 108 may continue with step 132 to create a new cache miss event.

In the step 132 the circuit 108 may determine a time used to fetch a missing data word from the circuit 106 to the circuit 104. The circuit 108 may use one or more techniques to measure the hold time (or delay time). In some embodiments, the circuit 104 may measure the hold time internally. The measured hold time may be presented in the signal HOLD. The circuit 108 generally records the hold time as received in the signal HOLD. In other embodiments, the circuit 108 may measure the hold time by monitoring the signal PC. If the cache miss causes the circuit 102 to stall, the program counter value in the signal PC may remain unchanged until the missing cache data is presented from the circuit 104 to the circuit 102. Once the circuit 102 has the requested data word, the program counter value in the signal PC may begin changing again. The amount of time that the signal PC remained unchanged may be a measure of the hold time. Other techniques for determining the hold time may be implemented to meet the criteria of a particular application.

In the step 134, the circuit 108 may identify a trigger program counter value (e.g., PCtrigger) corresponding to the value PCmiss. In some embodiments, the value PCtrigger may be the value PCmiss adjusted for the hold time. For example, if the program counter values are normally incremented by a single unit for each processor clock cycle, the adjustment may be the hold time in units of processor clock cycles (e.g., PCtrigger<PCmiss-HOLD).

In the step 136, the circuit 108 may record the new cache miss event in the file 112 (e.g., add another row to the table of FIG. 2). A check may be performed by the circuit 108 in the step 138 to determine if execution of the software code is continuing (e.g., the signal PC is still changing). If execution of the software code is not done (e.g., the NO branch of step 138), the method 120 may return to the step 126 to detect the next cache miss. If the software code is done executing (e.g., the YES branch of step 138), the file 112 may be unloaded from the circuit 108 in the step 140. In some embodiments, the unloaded file 112 may be stored in a nonvolatile memory within the apparatus 100 for later loading back into the circuit 108. In some embodiments, the file 112 may be accessible outside the apparatus 100 by the software code developers. The software code developers may use the information in the file 112 to insert prefetch instructions into the software code to minimize future cache misses after the software code has been recompiled.

Figure 4:
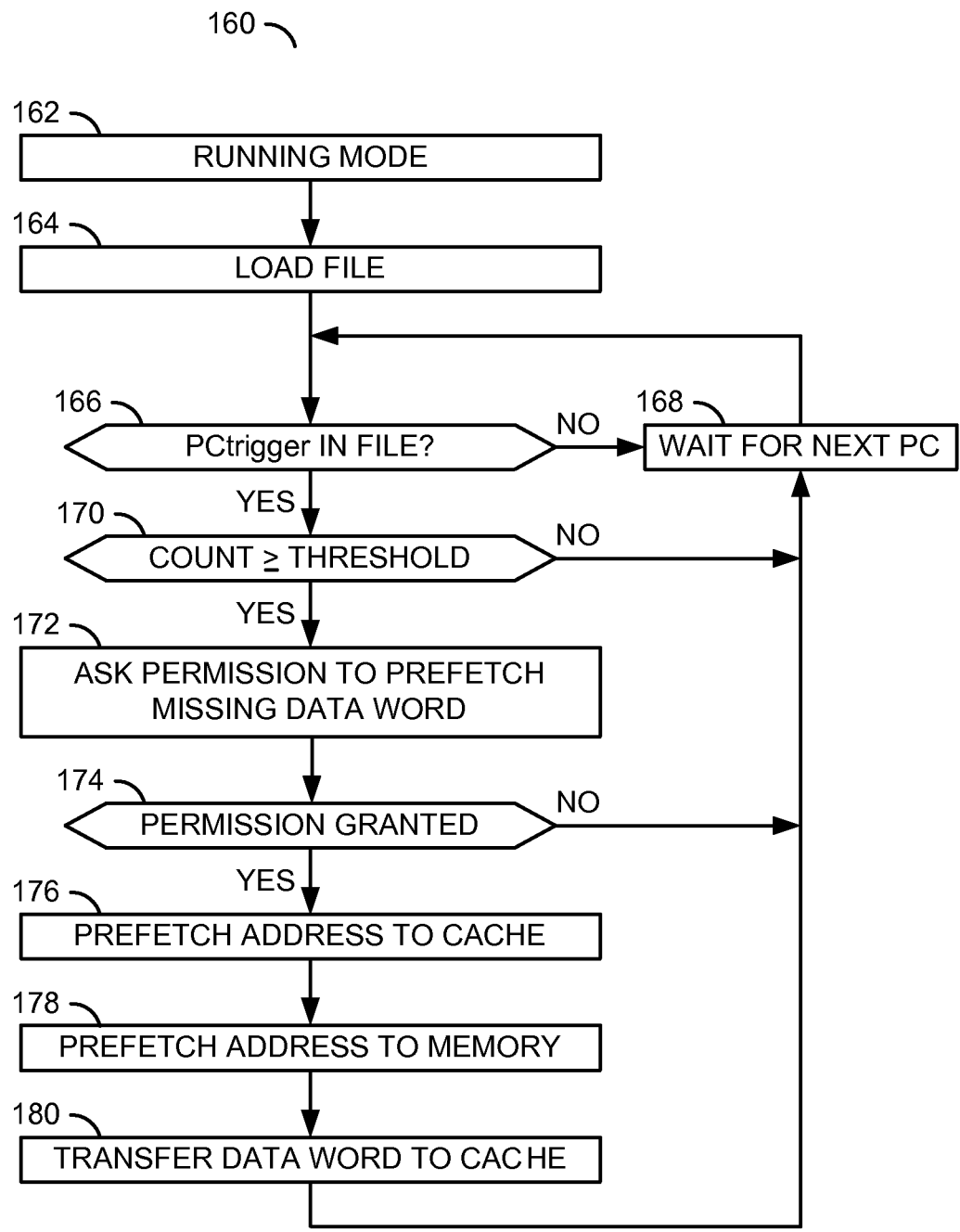
FIG. 4 is a flow diagram of an example implementation of a running method.

Referring to FIG. 4, a flow diagram of an example implementation of a running method 160 is shown. The method (or process) 160 may be implemented by the apparatus 100 such that the circuit 108 takes action to avoid cache misses. The method 160 generally comprises a step (or block) 162, a step (or block) 164, a step (or block) 166, a step (or block) 168, a step (or block) 170, a step (or block) 172, a step (or block) 174, a step (or block) 176, a step (or block) 178 and a step (or block) 180. The steps 162 to 180 may represent modules and/or blocks that may be implemented as hardware, firmware, software, a combination of hardware, firmware and/or software, or other implementations.

In the step 162, the circuit 108 may be placed in the running mode. As indicated above, the running mode may coexist with the learning mode. If a file 112 already exists for the software code being executed, the file 112 may be loaded into the circuit 108 in the step 164. Otherwise, the circuit 108 may use the file 112 previously created for the software code during the learning method 120.

In the step 166, the circuit 108 may monitor the signal PC to detect trigger program counter values. If the current program counter value is not a known value PCtrigger (e.g., the NO branch of step 166), the circuit 108 may wait in the step 168 for the next program counter value. If the current program counter value in the signal PC is a known value PCtrigger (e.g., the YES branch of the step 166), the circuit 108 may compare the corresponding count value with a threshold.

If the corresponding count value is below the threshold (e.g., the NO branch of step 170), the cache miss may be too rare to justify a prefetch operation. Therefore, the circuit 108 may return to the step 168 and wait for the next program counter value. If the corresponding count value matches or exceeds the threshold (e.g., the YES branch of step 170), the circuit 108 may take action to prefetch the data word stored in the circuit 106 per the corresponding address information.

In some embodiments, the circuit 108 may ask permission from the circuit 102 to prefetch the data word. The circuit 108 may ask permission by asserting the signal REQUEST in the step 172. If the circuit 102 denies the request (e.g., the NO branch of step 174), the circuit 108 may return to the step 168 and wait for the next program counter value without initiating the prefetch. If the circuit 102 grants the request via the signal GRANT (e.g., the YES branch of step 174), the circuit 108 may transfer a. prefetch address to the circuit 104 in the signal PADDR per the step 176. In the step 178, the circuit 104 may send the prefetch address to the circuit 106 in the signal FADDR. The circuit 106 may respond to the prefetch address by reading a cache line identified by the prefetch address. Once the prefetch data word has been transferred from the circuit 106 to the circuit 104 in the step 180, the circuit 108 may return to the step 168 and wait for the next program counter value.

The file 112 may be recorded and restored from/to the circuit 108 by a special dump instruction and a special restore instruction. The special instructions generally allow use of the information recorded locally by the circuit 108. Several ways exist to use the recorded information. For example, a report may be generated from the information in the file 112 for user by the software code developers. The information may allow the developers to place prefetch instructions manually in the software code and/or rearrange the software code to reduce the number and/or duration of the cache miss holds. The report may also be used by a compiler for automatic insertion of the prefetch instruction in the compiled code.

Another example use of the file 112 may be prefetch generation by the circuit 108. The prefetches may be generated by the circuit 108 when a program counter value received from the circuit 102 indicates that a temporal distance between a cache miss event recorded in the file 112 matches or is sufficiently close to the trigger program counter value or the cache miss program counter value to take action. The temporal distance generally depends on the hold durations recorded in the file 112.

The information stored in the file 112 generally allows the circuit 108 to identify historical data accesses that caused cache misses, what is the time to treat the cache misses and when/where during the software code execution the cache misses occurred. The circuit 108 may also store a number of accesses to the data words that were fetched after cache misses to generate a cost function for fetching of every cache line. Detection of the cache misses may be based on the cache holds, on the contents of the fill bus 110 and/or by the signal HIT/MISS generated be the circuit 104. The circuit 108 may generate prefetch distances and addresses based on information about cache misses. Special instructions in the programming model may be used to store and/or restore the recorded data to/from the circuit 108. The circuit 108 may initiate prefetches based on the information by issuing a prefetch instruction to the circuit 104. The information stored in the file 112 may also be used to inform the program developers of the performance of the software code and suggest places where permanent prefetch instruction may improve the performance.

The functions performed by the diagrams of FIGS. 3 and 4 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As would be apparent to those skilled in the relevant art(s), the signals illustrated in FIG. 1 represent logical data flows. The logical data flows are generally representative of physical data transferred between the respective blocks by, for example, address, data, and control signals and/or busses. The system represented by the apparatus 100 may be implemented in hardware, software or a combination of hardware and software according to the teachings of the present disclosure, as would be apparent to those skilled in the relevant art(s).

While the invention has been particularly shown and described with reference to the preferred embodiments thereof, it will be understood by those skilled in the art that various changes in form and details may be made without departing from the scope of the invention.

The invention claimed is:

1. An apparatus comprising:
a processor configured to generate (i) a plurality of access addresses and (ii) a plurality of program counter values corresponding to said access addresses, wherein said processor is implemented with hardware;
a cache configured to present in response to said access addresses (i) a plurality of data words, (ii) a plurality of address information corresponding to said data words and (iii) a hit/miss signal; and
a circuit configured to (a) record a plurality of events in a file in response to a plurality of cache misses while in a first mode and (b) initiate a prefetch of a first of said data words in response to reaching a particular one of said program counter values while in a second mode, wherein (A) a first of said events in said file due to a first of said cache misses comprises (i) a first of said program counter values, (ii) a first of said address information and (iii) a first time to transfer said first data word from a memory to said cache, (B) one of said cache or said circuit measures said first time to transfer said first data word from said memory to said cache, (C) said address information identifies where said data words missed in said cache are located in said memory, and (D) said particular program counter value is reached at least said first time before said first program counter value such that said prefetch of said first data word is complete before said first program counter value is reached.

2. The apparatus according to claim 1, wherein (i) said cache is further configured to assert said hit/miss signal in a miss state in response to said cache misses and (ii) said circuit records said first event in response to said assertion of said hit/miss signal corresponding to said first program counter value.

3. The apparatus according to claim 1, wherein (i) said cache is further configured to delay presentation of said data words in response to said cache misses and (ii) said circuit records said first event in response to observing said delay of said first data word from said cache.

4. The apparatus according to claim 1, further comprising a bus configured to transfer said data words from said memory to said cache, wherein said circuit records said first event in response to monitoring said transfer of said first data word on said bus.

5. The apparatus according to claim 1, wherein said file is accessible from outside of said circuit.

6. The apparatus according to claim 1, wherein said circuit is configured to receive said file from a source outside of said circuit.

7. The apparatus according to claim 6, wherein (i) said file as received from said source includes a second of said events and (ii) said circuit is further configured to initiate a prefetch of a second of said data words based on said second event.

8. The apparatus according to claim 1, wherein said first event includes a number of times said first program counter value causes said cache misses.

9. The apparatus according to claim 1, wherein said apparatus is implemented as an integrated circuit.

10. A method of prefetch learning for a cache, comprising the steps of:
    (A) generating (i) a plurality of access addresses and (ii) a plurality of program counter values corresponding to said access addresses;
    (B) presenting from said cache in response to said access addresses (i) a plurality of data words, (ii) a plurality of address information corresponding to said data words and (iii) a hit/miss signal;
    (C) measuring a first time to transfer a first of said data words from a memory to said cache;
    (D) recording a plurality of events in a file in response to a plurality of cache misses while in a first mode; and
    (E) initiating a prefetch of said first data word in response to reaching a particular one of said program counter values while in a second mode, wherein (a) a first of said events in said file due to a first of said cache misses comprises (i) a first of said program counter values, (ii) a first of said address information, (iii) said first time to transfer said first data word from said memory to said cache and (b) said address information identifies where said data words missed in said cache are located in said memory and (c) said particular program counter value is reached at least said first time before said first program counter value such that said prefetch of said first data word is complete before said first program counter value is reached.

11. The method according to claim 10, further comprising the step of:
    asserting said hit/miss signal in a miss state in response to said cache misses, wherein said first event is recorded in response to said assertion of said hit/miss signal corresponding to said first program counter value.

12. The method according to claim 10, further comprising the step of:
    delaying presentation of said data words from said cache in response to said cache misses, wherein said first event is recorded in response to observing said delaying of said first data word from said cache.

13. The method according to claim 10, further comprising the step of:
    transferring said data words on a bus from said memory to said cache, wherein said first event is recorded in response to monitoring said transfer of said first data word on said bus.

14. The method according to claim 10, wherein (i) said file is stored in a circuit and (ii) said file is accessible from outside of said circuit.

15. The method according to claim 10, wherein (i) said file is stored in a circuit and (ii) said file is received from a source outside of said circuit.

16. The method according to claim 15, wherein said file as received from said source includes a second of said events, the method further comprising the step of:
    initiating a prefetch of a second of said data words based on said second event.

17. The method according to claim 10, wherein said first event includes a number of times said first program counter value causes said cache misses.

18. The method according to claim 10, wherein (i) said measuring of said first time is performed internal to said cache in response to a corresponding one of said cache misses and (ii) said first time is presented from said cache in a signal.

19. The method according to claim 10, wherein said measuring of said first time monitors an amount of time that said program counter values remain unchanged after a corresponding one of said cache misses.

20. An apparatus comprising:
    means for processing configured to generate (i) a plurality of access addresses and (ii) a plurality of program counter values corresponding to said access addresses;
    means for caching configured to present in response to said access addresses (i) a plurality of data words, (ii) a plurality of address information corresponding to said data words and (iii) a hit/miss signal;
    means for measuring a first time to transfer a first of said data words from a memory to said means for caching; and
    means for learning configured to record a plurality of events in a file in response to a plurality of cache misses while in a first mode; and
    means for initiating a prefetch of said first data word in response to reaching a particular one of said program counter values while in a second mode, wherein (A) a first of said events in said file due to a first of said cache misses comprises (i) a first of said program counter values, (ii) a first of said address information and (iii) said first time to transfer said first data word from said memory to said means for caching, (B) said address information identifies where said data words missed in said cache are located in said memory and (C) said particular program counter value is reached at least said first time before said first program counter value such that said prefetch of said first data word is complete before said first program counter value is reached.

* * * * *